United States Patent [19]

Bulman et al.

[11] Patent Number: 5,058,984
[45] Date of Patent: Oct. 22, 1991

[54] METHOD AND APPARATUS FOR COUPLING OPTICAL FIBER CABLES

[75] Inventors: Jonathan M. Bulman, London; Glenton P. McFarlane, Northolt; Sean Maguire, London, all of England

[73] Assignee: U.S. Philips Corp., New York, N.Y.

[21] Appl. No.: 547,572

[22] Filed: Jun. 28, 1990

[30] Foreign Application Priority Data

Jun. 30, 1989 [GB] United Kingdom ............... 8915064

[51] Int. Cl.⁵ .............................................. G02B 6/38
[52] U.S. Cl. .................................................. 385/80
[58] Field of Search ......................... 350/96.20-96.22

[56] References Cited

U.S. PATENT DOCUMENTS

| 4,447,121 | 5/1984 | Cooper et al. | 350/96.20 |
| 4,679,895 | 7/1987 | Huber | 350/96.20 |
| 4,697,870 | 10/1987 | Richards | 350/96.21 |
| 4,743,084 | 5/1988 | Manning | 350/96.21 |
| 4,842,363 | 6/1989 | Margolin et al. | 350/96.21 |

FOREIGN PATENT DOCUMENTS 143307 4/1985 Japan .
0150009 4/1985 Japan .
170808 4/1985 Japan .

Primary Examiner—Akm Ullah
Attorney, Agent, or Firm—William L. Botjer

[57] ABSTRACT

A tubular connector body (10) has one end (11) for receiving an optical fibre cable (1) having a plastics outer sleeve (3) protecting an optical fibre (2) and carries at the other end (12) connection means (20) for coupling to another similar connection body. A ferrule (30) is mounted within the other end (12) of the connector body (10) to support an exposed end portion (2a) of the optical fibre (2) within an irradiation settable adhesive material (40) injected into the ferrule (30). A deformable gripping member (50) is inserted into the one end (11) of the connector body (10) to grip an end portion (3a) of the plastics outer sleeve (3) of the cable upon deformation of the gripping member (50) by application of a force to the one end (11) of the tubular connector body (10).

18 Claims, 2 Drawing Sheets

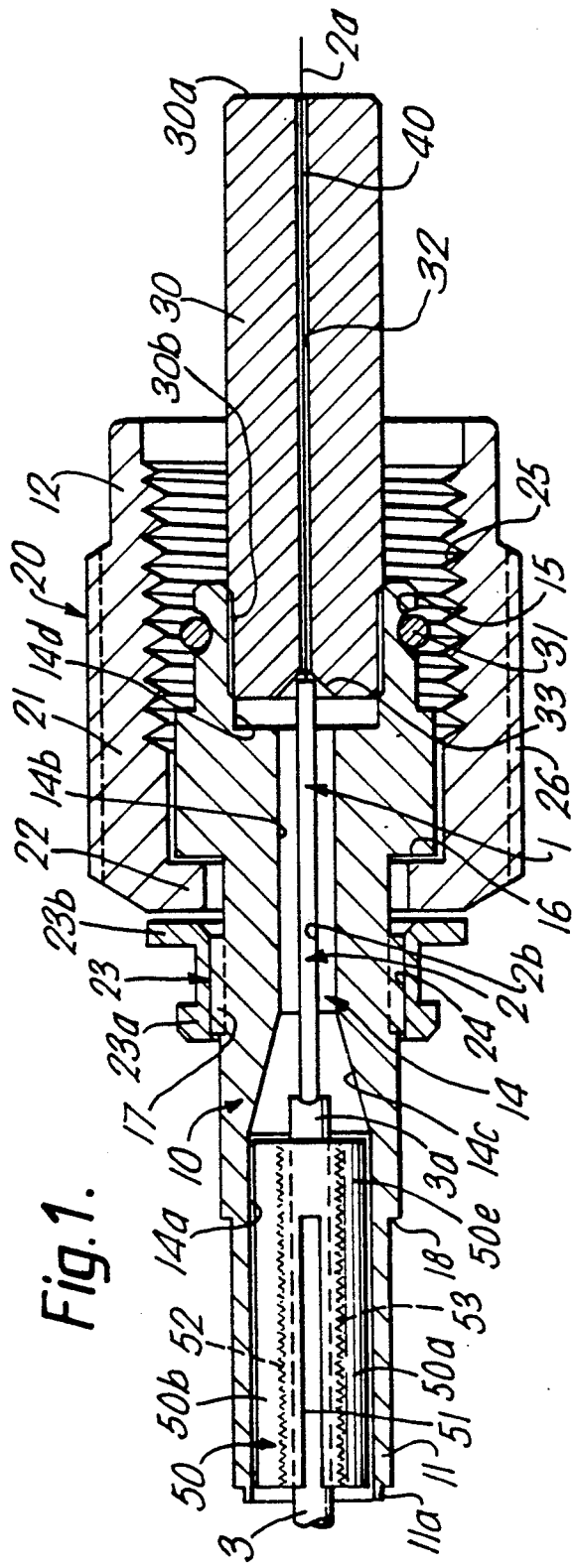
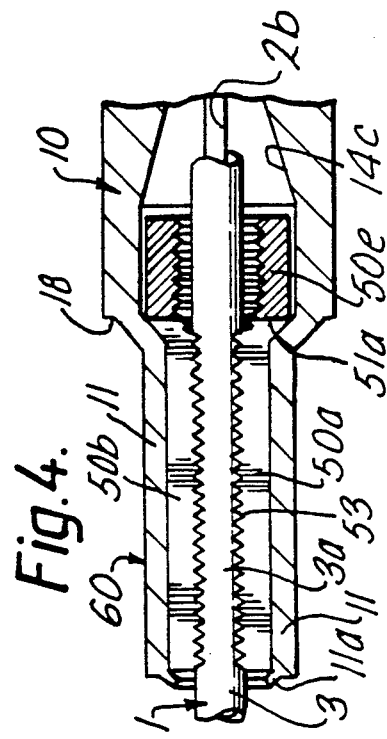
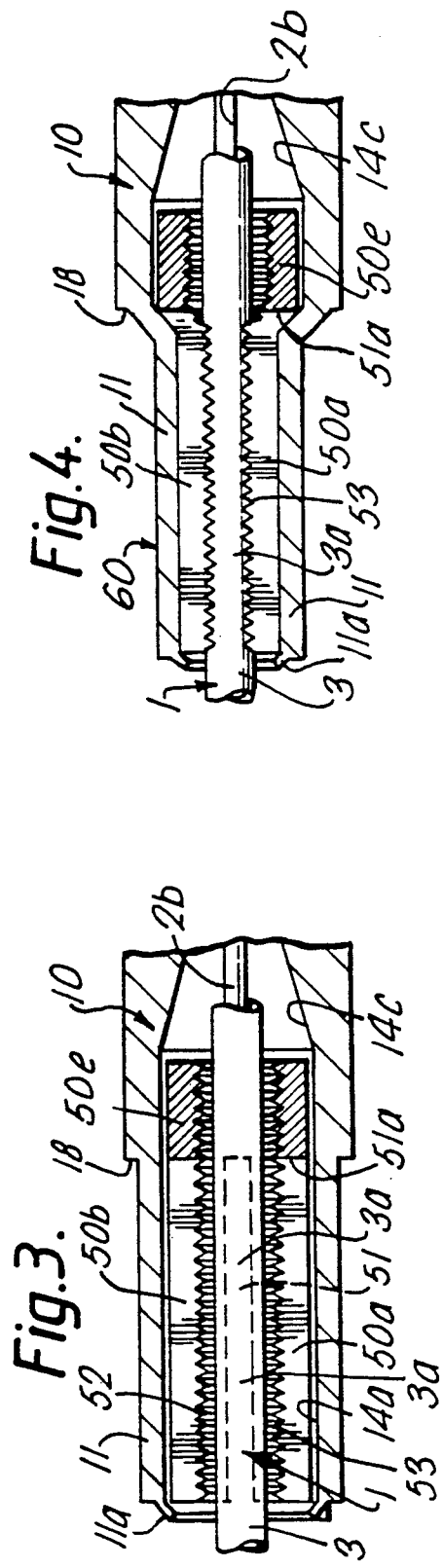

METHOD AND APPARATUS FOR COUPLING OPTICAL FIBER CABLES

BACKGROUND OF THE INVENTION

This invention relates to optical fibre connectors and particularly to a method and apparatus for enabling an optical fibre cable having a plastics outer sleeve to be optically coupled to another optical fibre cable or to an active device.

Conventionally, in order to enable such optical coupling of an optical fibre cable, a tubular connector body is provided having one end for receiving an optical fibre and carrying at the other end connection means for coupling to another connector body. A ferrule for supporting an optical fibre is mounted within the other end of the connector body. A settable adhesive material, usually a resin, is injected into the ferrule and an optical fibre cable is then inserted into the one end of the connector body so that an exposed end portion of the optical fibre cable passes into the ferrule. The settable resin is then cured by a heat treatment to secure the optical fibre within the ferrule. This heat treatment involves subjecting the optical fibre cable and connector body to relatively high temperatures of, for example, about 100 degrees Celsius for about ten minutes and it is then necessary to allow the connector body to cool down before it can be handled. This heat treatment is thus time-consuming. In addition, the hardness of the cured resin tends to be inconsistent and this heat treatment may induce stress in the optical fibre. The hot resin exhibits a very low viscosity and may flow by capillary action into areas where it is not desired. Moreover, the protective plastics outer sleeve of the optical fibre cable is normally formed of a very inert and slippery plastics material such as PTFE (polytetrafluoroethylene) and does not easily adhere to the resin. It is therefore possible that the optical fibre itself may be securely fixed in place within the ferrule but that the plastics outer sleeve may be free to move within the tubular connector body so that any load applied on the cable may cause the plastics outer sleeve to move relative to the optical fibre resulting in undue stresses and strains on the optical fibre and possibly even causing the optical fibre to break.

SUMMARY OF THE INVENTION

It is an object of the present invention to provide a method and apparatus for enabling an optical fibre cable having a plastics outer sleeve to be optically coupled to another optical fibre cable or an active device in a manner which prevents or at least inhibits relative movement between the optical fibre and its plastics outer sleeve at the coupling.

According to one aspect of the present invention, there is provided a method of enabling an optical fibre cable having a plastics outer sleeve to be optically coupled to another optical fibre cable or to an active device, which method comprises providing a tubular connector body having one end for receiving an optical fibre cable and carrying at the other end connection means for coupling to another connector body, mounting a ferrule for supporting an optical fibre within the other end of the connector body, inserting a deformable tubular gripping member into the one end of the connector body, injecting a settable adhesive material into the ferrule, removing the plastics outer sleeve from an end portion of the optical fibre cable, inserting the optical fibre cable into the other end of the connector body until the exposed end portion of the optical fibre passes through the ferrule, and an end portion of the plastics outer sleeve is received within the deformable gripping member, applying a force to the one end of the connector body causing the gripping member to deform so as to grip the end portion of the plastics outer sleeve, and irradiating the connector body to cause the adhesive material to set to secure the end portion of the optical fibre within the ferrule.

In another aspect, the present invention provides apparatus for enabling an optical fibre cable having a plastics outer sleeve to be optically coupled to another optical fibre cable, the apparatus comprising a tubular connector body having one end for receiving an optical fibre cable and carrying at the other end connection means for coupling to another connector body, a ferrule for mounting within the other end of the connector body to support an exposed end portion of an optical fibre within an irradiation settable adhesive material injected into the ferrule and a deformable tubular gripping member for insertion into the one end of the connector body to grip an end portion of the plastics outer sleeve of the cable upon deformation of the gripping member by application of a force to the one end of the connector body.

The present invention also provides a fibre optic cable connector for enabling an optical fibre cable having a plastics outer sleeve to be optically coupled to another optical fibre cable, the connector comprising a tubular connector body receiving at one end an optical fibre cable and carrying at the other end connection means for coupling to another connector body, a tubular gripping member received within the one end of the connector body and deformed by application of a force to the one end of the connector body so as to grip an end portion of the plastics outer sleeve of the cable, and a ferrule mounted within the other end of the connector body and supporting an exposed end portion of an optical fibre within irradiation set adhesive material.

Using the present invention, the deformable gripping member, when deformed, acts to hold the plastics outer sleeve of the optical fibre cable firmly in place within the tubular connector body so inhibiting or at least reducing relative movement between the optical fibre and its protective plastics outer sleeve and enabling an irradiation curable adhesive material which, in the absence of the deformable gripping member might not itself adhere sufficiently strongly to the plastics outer sleeve, to be used to secure the end portion of the optical fibre within the ferrule. The adhesive material used for securing the end portion of the optical fibre in place within the ferrule can thus be selected as desired for the manufacturing conditions and for its ability to adhere to the optical fibre without having to consider whether or not the chosen adhesive material will adhere sufficiently strongly to the plastics outer sleeve. Furthermore, because it is not now necessary for the adhesive material to adhere to the plastics outer sleeve, the amount of adhesive material injected need only be sufficient to fill the relatively narrow passageway of the ferrule so reducing the amount of adhesive material required as compared with conventional arrangements where the adhesive material is used to secure the plastics outer sleeve in place within the tubular connector body.

Conveniently, the ferrule is a ceramics ferrule and the adhesive material comprises a light curable resin which is injected into the ferrule and is caused to set by irradiating the ferrule with light of a wavelength which passes into the ceramic ferrule, generally blue light with a wavelength of about 470 nm (nanometers) where the ferrule is formed of zirconia. Using such a light curable resin enables the setting time to be much reduced, to for example about sixty seconds, and avoids having to subject the optical fibre cable and connector body to high temperatures.

The deformable gripping member generally comprises an elongate tubular sleeve having an inner surface provided with gripping means conveniently in the form of a screwthreaded surface, and having one or more longitudinally extending slots, the deformable gripping member being caused to deform by crimping the one end of the connector body onto the gripping member, thereby causing the slot(s) to close so as to bring the gripping surface into engagement with the plastics outer sleeve of the cable.

Normally, to ensure that the crimping force is evenly applied around the plastics outer sleeve, a number, for example four, longitudinally extending slots are evenly spaced about the pereiphery of the tubular gripping sleeve.

BRIEF DESCRIPTION OF THE PREFERRED EMBODIMENT

An embodiment of the invention will now be described, by way of example with reference to the accompanying drawings, in which:

FIG. 1 is a part cross-sectional view illustrating the assembled tubular connector body, ferrule and deformable gripping member for carrying out a method in accordance with the invention, and showing the optical fibre cable inserted into the one end of the tubular connector body;

FIG. 3 is an enlarged part-sectional view of the one end of the connector body shown in FIG. 1 for illustrating the situation prior to deformation of the deformable gripping member;

FIG. 4 is an enlarged part-sectional view similar to FIG. 3 for illustrating the situation after deformation of the deformable gripping member.

Figure 2:
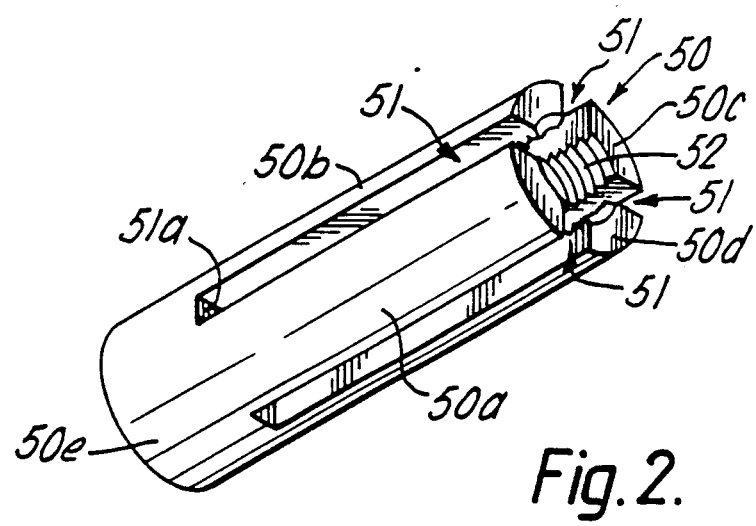
FIG. 2 is a perspective view of the deformable gripping member.

It should, of course, be understood that the Figures are merely schematic and are not drawn to scale.

DETAILED DESCRIPTION OF THE PREFERRED EMBODIMENT

Referring now to the drawings and in particular FIG. 1 there is illustrated assembled apparatus for carrying out a method in accordance with the invention. The apparatus comprises a tubular connector body 10 having one end 11 for receiving an optical fibre cable 1 having a plastics outer sleeve 3 protecting an optical fibre 2 and carrying at the other end 12 connection means 20 for coupling to another similar connection body (not shown). A ferrule 30 is mounted within the other end 12 of the connector body 10 to support an exposed end portion 2a of the optical fibre 2 of the cable 1 within an irradiation settable adhesive material 40 injected into the ferrule 30. A deformable tubular gripping member 50 is inserted into the one end 11 of the tubular connector body 10 to grip an end portion 3a of the plastics outer sleeve 3 of the cable upon deformation of the deformable gripping member 50 by application of a force to the one end 11 of the tubular connector body.

The deformable gripping member 50, when deformed, acts to hold the plastics outer sleeve 3 of the optical fibre cable 1 firmly in place within the tubular connector body 10 so inhibiting or at least reducing relative movement between the optical fibre and its protective plastics outer sleeve 3 as will become evident from the following more detailed description.

In the example shown in FIG. 1, the optical fibre cable 1 is a single strand cable, that is it carries only a single optical fibre 2 of conventional type loosely received within the protective plastics outer sleeve 3 which is typically formed of PTFE (polytetrafluoroethylene) or a similar inert slippery plastics material. The plastics outer sleeve 3 generally has an external diameter of about 1 mm (millimeter) although this may vary from about 0.9 mm to about 1.2 mm.

In this example the tubular connector body 10 is formed by a generally cylindrical metal, for example stainless steel, body having an internal axially extending bore 14 which narrows, via a frusto-conical section 14c, from an enlarged section 14a adjacent the one end 11 for receiving the deformable gripping member 50 to a narrow diameter section 14b into which, as will be explained below, the optical fibre cable 1 extends. The one end 11 of the tubular connector body 10 has a reduced thickness section 11a which as will be described below, serves to retain the deformable gripping member 50 within the enlarged section 14a of the bore 14. The frusto-conical section 14c of the bore acts, of course, to prevent movement of the deformable gripping member 50 further into the bore 14. The narrow section 14b of the bore 14 opens out into an enlarged end section 14d within which an end portion 30b of the ferrule 30 is a push or interference fit.

In this example the connection means 20 is provided by a metal, for example stainless steel, cylindrical collar 21 which is slid over the one end 11 of the tubular connector body 10 until an inwardly-directed flange 22 of the collar 21 rests against a shoulder 16 of the connector body 10. An annular locating ring 23 having at each end a radially outwardly directed flange 23a, 23b is slid onto one end 11 of the connector body 10 until it forms an interference fit 24 with a knurled surface 17 provided on the tubular body 10. The locating ring 23 serves, as can be seen from FIG. 1, to hold the cylindrical collar 21 in position on the connector body 10. The cylindrical collar 21 has an internal screwthreaded surface 25 for engaging a corresponding externally screwthreaded surface of a coupling member (not shown) to enable the connector body 10 to be connected to a similar connector body (not shown) for providing optical coupling between the optical fibres carried by the two connector bodies 10. The collar 21 has an outer knurled surface 26 for facilitating engagement of the screwthreads to connect the connector body 10 to the coupling member (not shown).

An 'O' ring 31 may be received in a groove 15 provided on the periphery of the other end 12 of the tubular connector body 10 to provide a seal between the connector body and the coupling member (not shown).

In this example, as can be seen most clearly from FIG. 2, the deformable gripping member 50 comprises a cylindrical tubular sleeve formed of, for example, brass. The tubular gripping sleeve 50 has, as shown, four longitudinally extending slots 51 which extend along the majority of the length of the tubular gripping sleeve 50 and which are evenly spaced about the periphery of the tubular gripping sleeve 50 so as to divide the majority of the length of the gripping sleeve 50 into four segments 50a to 50d joined together by a cylindrical end section 50e. The inner surface of the tubular gripping sleeve 50 is provided with gripping means which in this case is formed by a screwthread 52 although other means of providing a roughened gripping surface could be used. Generally, for the type of optical fibre cable 1 mentioned above, the tubular gripping sleeve 50 has an internal diameter of about 1.2 mm so as to accommodate the outer plastics sleeve 3 of the cable 1 and the slots 51 typically have a width (circumferentially of the tubular gripping sleeve 50) of about 0.4 mm and a length of 5.5 mm, the overall length of the gripping sleeve being about 7 mm and its external diameter being about 2.32 mm so as to form a close but not tight fit within the enlarged section 14a of the bore 14 of the tubular connector body 10.

The ferrule 30 is, in this example, a zirconia ceramics ferrule typically of diameter 3.17 mm having an internal through bore 32 of diameter 12.5 micrometers for receiving the optical fibre 2 and settable resin 40.

In order to secure the optical fibre cable 1 to the connector body 10, the collar 21 is first slipped over the one end 11 of the connector body 10 to rest against the shoulder 16 followed by the locating ring 23 which, as mentioned above, forms an interference fit 24 with the knurled surface 17 to hold the collar 21 in place. The deformable gripping member 50 is then slid into the one end 11 of the connector body 10 and the ferrule 30 push-fitted into the enlarged section 14d and the ferrule 30 and the 'O' ring 31 secured in the groove 15, The act of securing the ferrule 30 in the enlarged section 14d, causes the reduced thickness section 11a at the one end of the connector body 10 to be pushed radially inwardly as shown in FIGS. 3 and 4 to prevent the deformable gripping member 50 falling out of the enlarged section 14a of the passageway 14.

The irradiation settable adhesive material 40 is then injected into the internal through-bore 32 of the ferrule 30 by inserting a conventional resin-injecting needle (not shown) into the passageway 14 so that the needle tip seals with a frusto-conical seat 33 provided at the rear end of the ferrule 30.

In this example, a light curable resin which is curable by light of a wavelength which can penetrate the zirconia ceramics ferrule 30 is used as the irradiation settable adhesive material. For example, the resin used may be LCR200 manufactured by ICI which can be cured using blue light of a wavelength of 470 nm (nanometers) to a depth of several nanometers within one minute. The 470 nm blue light penetrates the zirconiaceramics ferrule 30 to a depth of about 10 mm.

After injection of the light curable resin 40 into the ferrule 30, excess resin is wiped from the end face 30a of the ferrule and the optical fibre cable 1 with the plastics outer sleeve 3 stripped from the end of the cable 1 to a distance of about 25 mm to expose an end portion 2a of the optical fibre 2 is inserted into the one end 11 of the tubular connector body 10 in conventional manner until the optical fibre 2 protrudes from the end face 30a of the ferrule 30. The outer coating 2b of the optical fibre 2 has been stripped from the portion of the optical fibre 1 which will enter the ferrule 30. The exposed end portion 2a of the optical fibre 2 is of such a length that the end portion 3a of the plastics outer sleeve 3 terminates within the frusto-conical section 14c of the passageway 14 as shown most clearly in FIG. 2.

The one end 11 of the tubular connector body 10 is then inserted into a conventional crimping tool (not shown) which in this example produces a hexagonal cross-section crimp 60 (FIG. 4). As is shown most clearly in FIG. 1, the one end 11 of the tubular body 10 is provided with a crimp shoulder 18 which is located at or close to the ends 51a of the slots 51 so that the jaws of the crimping tool cannot extend beyond the crimp shoulder 18 thereby ensuring that the crimping force is only applied along the slotted section of the deformable gripping member 50.

The force applied by the crimping tool causes the gripping member 50 to deform radially inwardly causing the slots 51 to close so that the central bore of the gripping member 50 narrows bringing the gripping surface into engagement with the plastics outer sleeve 3. At the same time the crimping action crimps the one end 11 to secure the gripping member 50 within the tubular connector body 10. The screwthreaded gripping surface 52 deforms the plastics outer sleeve 3 so that there is a slight overall reduction in the outer and inner diameters of the plastics outer sleeve 3 and the profile of the screwthread is such that the teeth 53 form a series of shallow incisions to hold the loose plastics outer sleeve 3 firmly within the gripping member 50 which is itself now held securely within the connector body 10.

The plastics outer sleeve 3 is thus firmly held in position within the connector body 10.

Figure 5:
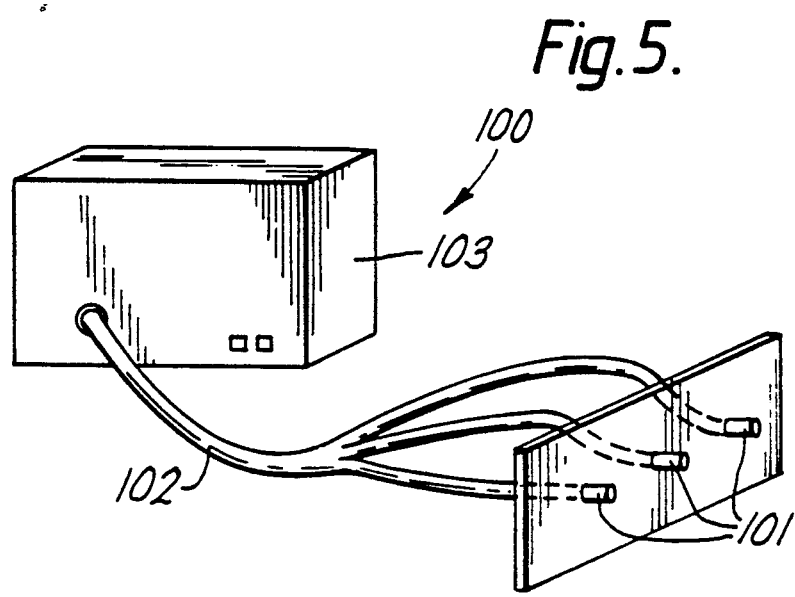
FIG. 5 illustrates one example of apparatus for enabling curing of the settable resin to secure the optical fibre within the ferrule.

In order to cure or set the light curable resin 40 to complete the fibre optic cable connector, the connector body 10 may, for example, be fitted into one of the array of adaptors 101 of the curing apparatus 100 shown in FIG. 5, although other methods of curing the resin may be used. Each of the adaptors is connected via an optical fibre 102 to a light source 103 which supplies blue light of wavelength 470 nm to the adaptors. The zerconia ceramics ferrule 30 is thus irradiated by the blue light from the apparatus 100. This blue light has a penetration depth of about 10 mm in the zirconia ceramics of the ferrule and thus passes through the ferrule to irradiate the resin. In this example, the resin is set or cured by an irradiation time of about 60 seconds.

The connector body 10 is then removed from the adaptor 101 and the protruding end portion of the optical fibre 2 cleaved in conventional manner. The end face 30a of the ferrule is then polished using conventional means. A conventional protection boot or cap (not shown) may then be placed over the one end 11 of the connector body 10 to protect the end face 30a of the ferrule 30 whilst the connector is not in use.

The fibre optic cable connector may now be coupled in conventional manner to another similar fibre optic cable carrying a similar connector body via a connection device which engages in known manner with the screw-threaded connection means 20 or directly with a complementary connector body carried by the other optical fibre cable. Alternatively, the connector may be coupled directly with an active device.

As described above, the deformable gripping member, when deformed, acts to hold the plastics outer sleeve of the optical fibre cable firmly in place within the tubular connector body so inhibiting or at least reducing relative movement between the optical fibre and its loose protective plastics outer sleeve and enabling the end portion of the optical fibre to be secured in place within the ferrule using an irradiation curable adhesive material such as a resin which might not, or not sufficiently strongly, adhere to the plastics outer sleeve. The adhesive material used to secure the end portion of the optical fibre within the ferrule can thus be selected as desired for the manufacturing conditions and for its ability to adhere to the optical fibre without having to consider whether the chosen resin or curing process used provides any adhesion between the resin and the plastics protective outer sleeve 3. Furthermore, because it is not now necessary for the adhesive material to adhere to the plastics outer sleeve, the amount of adhesive material injected need only be sufficient to fill the relatively narrow passageway for the ferrule so reducing the amount of adhesive material required as compared with conventional arrangements where the adhesive material is used to secure the plastics outer sleeve in place within the tubular connector body.

Using a light curable adhesive material such as the resin described above enables the setting time to be much reduced, to for example about sixty seconds, and avoids having to subject the optical fibre cable and connector body to high temperatures.

From reading the present disclosure, modifications or variations will be apparent to persons skilled in the optical fibre connector art and which may be used instead of or in addition to features already described herein. Although claims have been formulated in this application to particular combinations of features, it should be understood that the scope of the disclosure of the present combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of enabling an optical fibre cable having a plastics outer sleeve to be optically coupled to another optical fibre cable or active device, which method comprises providing a tubular connector body having one end for receiving an optical fibre cable and carrying at the other end connection means for coupling to another connector body, mounting a ferrule for supporting an optical fibre within the other end of the connector body, inserting a deformable tubular gripping member into the one end of the connector body, injecting a settable adhesive material into the ferrule, removing the plastics outer sleeve from an end portion of the optical fibre cable, inserting the optical fibre cable into the other end of the connector body until the exposed end portion of the optical fibre passes through the ferrule, and an end portion of the plastics outer sleeve is received within the deformable gripping member, applying a force to the one end of the connector body causing the gripping member to deform so as to grip the end portion of the plastics outer sleeve, and irradiating the connector body to cause the adhesive material to set to secure the end portion of the optical fibre within the ferrule.

2. A method according to claim 1, which further comprises providing the ferrule as a ceramic ferrule and mounting the ferrule within the other end of the connector body so that the ferrule projects from the connector body, injecting the adhesive material as a light curable resin into the ferrule and causing the resin to set by irradiation with light of a wavelength which passes into the ceramics ferrule.

3. A method according to claim 2, which further comprises using as the deformable gripping member an elongate tubular sleeve having an inner surface provided with gripping means and having one or more longitudinally extending slots, and causing the deformable gripping member to deform by crimping the one end of the connector body to cause the slot(s) to close.

4. A method according to claim 1, which further comprises using as the deformable gripping member an elongate tubular sleeve having an inner surface provided with gripping means and having one or more longitudinaly extending slots, and causing the deformable gripping member to deform by crimping the one end of the connector body to cause the slot(s) to close.

5. Apparatus for enabling an optical fibre cable having a plastics outer sleeve to be optically coupled to another optical fibre cable, the apparatus comprising a tubular connector body having one end for receiving an optical fibre cable and carrying at the other end connection means for coupling to another connector body, a ferrule for mounting within the other end of the connector body to support an exposed end portion of an optical fibre within an irradiation settable adhesive material injected into the ferrule, and a deformable tubular gripping member for insertion into the one end of the connector body to grip an end portion of the plastics outer sleeve of the cable upon deformation of the gripping member by application of a force to the one end of the connector body.

6. Apparatus according to claim 5, wherein the ferrule is a ceramic ferrule and the irradiation settable adhesive material is a resin is settable by light of a wavelength which passes into the ferrule.

7. Apparatus according to claim 6, wherein the deformable member comprises an elongate tubular sleeve having an inner surface provided with gripping means and having one or more longitudinally extending slots for allowing the gripping sleeve to be deformed upon crimping of the one end of the connector body to cause the gripping surface to grip the end portion of the plastics outer sleeve.

8. Apparatus according to claim 5, wherein the deformable member comprises an elongate tubular sleeve having an inner surface provided with gripping means and having one or more longitudinally extending slots for allowing the gripping sleeve to be deformed upon crimping of the one end of the connector body to cause the gripping surface to grip the end portion of the plastics outer sleeve.

9. Apparatus according to claim 8, wherein the gripping sleeve has four longitudinally extending slots spaced evenly about the periphery of the gripping sleeve.

10. Apparatus according to claim 9, wherein the gripping means comprises a screwthread formed on the inner surface of the tubular gripping sleeve.

11. Apparatus according to claim 8, wherein the gripping means comprises a screwthread formed on the inner surface of the tubular gripping sleeve.

12. A fibre optic cable connector for enabling an optical fibre cable having a plastics outer sleeve to be optically coupled to another optical fibre cable, the connector comprising a tubular connector body receiving at one end an optical fibre cable and carrying at the other end connection means for coupling to another connector body, a tubular gripping member received within the one end of the connector body and deformed by application of a force to the one end of the connector body so as to grip an end portion of the plastics outer sleeve of the cable, and a ferrule mounted within the other end of the connector body and supporting an exposed end portion of an optical fibre within irradiation set adhesive material.

13. A connector accoding to claim 12, wherein the ferrule is a ceramic ferrule and the irradiation set adhesive material comprises a resin set by light of a wavelength capable of passing into the ferrule.

14. A connector according to claim 13, wherein the tubular gripping member comprises an elongate tubular sleeve having an inner surface provided with gripping means and having one or more longitudinally extending slots deformed by crimping of the one end of the connector body so as to grip the end portion of the plastics outer sleeve.

15. A connector according to claim 12, wherein the tubular gripping member comprises an elongate tubular sleeve having an inner surface provided with gripping means and having one or more longitudinally extending slots deformed by crimping of the one end of the connector body so as to grip the end portion of the plastics outer sleeve.

16. A connector according to claim 15, wherein the gripping sleeve has four longitudinally extending slots spaced evenly about the periphery of the gripping sleeve.

17. A connector according to claim 15, wherein the gripping means comprises a screwthread formed on the inner surface of the tubular gripping sleeve.

18. A connector accoding to claim 16, wherein the gripping means comprises a screwthread formed on the inner surface of the tubular gripping sleeve.

* * * * *